United States Patent
Qiu et al.

(10) Patent No.: US 10,241,860 B2
(45) Date of Patent: Mar. 26, 2019

(54) METHOD OF EXECUTING DATA SCRUBBING INSIDE A SMART STORAGE DEVICE

(71) Applicant: Samsung Electronics Co., Ltd., Suwon-si, Gyeonggi-do (KR)

(72) Inventors: Sheng Qiu, San Jose, CA (US); Yang Seok Ki, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

(21) Appl. No.: 15/284,478

(22) Filed: Oct. 3, 2016

(65) Prior Publication Data

US 2018/0046546 A1 Feb. 15, 2018

Related U.S. Application Data

(60) Provisional application No. 62/375,411, filed on Aug. 15, 2016.

(51) Int. Cl.
*G06F 11/10* (2006.01)
*G06F 3/06* (2006.01)
*G06F 17/30* (2006.01)

(52) U.S. Cl.
CPC ............ *G06F 11/106* (2013.01); *G06F 3/064* (2013.01); *G06F 3/0619* (2013.01); *G06F 3/0673* (2013.01); *G06F 11/1076* (2013.01); *G06F 17/30129* (2013.01)

(58) Field of Classification Search
CPC .. G06F 11/1076; G06F 11/11; G06F 11/1068; G06F 3/0619; G06F 3/064; G06F 3/0689; G06F 11/106; G06F 3/0659; G06F 3/061
See application file for complete search history.

(56) References Cited

U.S. PATENT DOCUMENTS

| | | | |
|---|---|---|---|
| 7,661,045 B2 | 2/2010 | Browne et al. | |
| 8,145,941 B2 * | 3/2012 | Jacobson | G06F 11/1076 714/6.24 |
| 8,280,858 B2 | 10/2012 | Ahrens et al. | |
| 8,307,259 B2 | 11/2012 | Wheeler et al. | |
| 8,543,556 B2 | 9/2013 | Nagpal et al. | |
| 9,081,693 B2 | 7/2015 | Ramaraju et al. | |
| 2008/0155369 A1 * | 6/2008 | Takaku | G06F 11/106 714/746 |
| 2013/0128666 A1 * | 5/2013 | Avila | G06F 11/1048 365/185.11 |
| 2014/0006859 A1 | 1/2014 | Ryu | |
| 2017/0242585 A1 * | 8/2017 | Eguchi | G06F 3/061 |

* cited by examiner

*Primary Examiner* — Shelly A Chase
(74) *Attorney, Agent, or Firm* — Lewis Roca Rothgerber Christie LLP (57) ABSTRACT

A smart storage device is provided. The smart storage device contains a data analysis engine and an error detection engine. An external controller sends a command indicating that data contained on a storage medium in the smart storage device which meets certain criterion should be scrubbed, and the smart storage device locates that data without the external controller passing the actual location of the data on the storage medium.

20 Claims, 3 Drawing Sheets

FIG. 6

METHOD OF EXECUTING DATA SCRUBBING INSIDE A SMART STORAGE DEVICE

CROSS-REFERENCE TO RELATED APPLICATION(S)

The present application claims priority to and the benefit of U.S. Provisional Application No. 62/375,411, filed Aug. 15, 2016, entitled "METHOD OF EXECUTING DATA SCRUBBING INSIDE A SMART STORAGE DEVICE", the entire content of which is incorporated herein by reference.

FIELD

The present disclosure relates to the field of data storage devices, especially scrubbing data in a data storage device.

BACKGROUND

Data scrubbing is a background task that periodically inspects memory or storage for errors, and then corrects them using redundant data in the forms of checksums, error correcting codes, or copies of data.

Many applications use data scrubbing. For example, a file system may utilize data scrubbing for checking the integrity of data stored on storage devices, and a database may utilize data scrubbing for checking the integrity of database records.

As part of a data scrubbing operation, an application may generally identify which data to perform the scrubbing on by passing the data's locations to the storage device (such as start logical block address and length). The storage device may then read the specified data and check its integrity.

The above information disclosed in this Background section is only for enhancement of understanding of the background of the invention, and therefore it may contain information that does not form the prior art that is already known to a person of ordinary skill in the art.

SUMMARY

According to aspects of the present disclosure, a smart storage device can intelligently select data based on information (including attributes other than the data location) passed by applications and perform scrubbing (for example, read scrubbing) on those data and report the result to applications.

In one aspect of the present disclosure, an electronic device is provided. The electronic device includes a storage controller configured to receive a scrubbing search criterion. The storage controller includes a data analysis engine and an error detection engine. The data analysis engine is configured to access a data attribute object associated with a data element contained in a computer readable medium, each data element being stored in association with a data attribute object, each data element comprising a data object and an error correction object, the data analysis engine being further configured to find data elements contained in the computer readable medium associated with data attribute objects corresponding to the scrubbing search criterion. The error detection engine is configured to, for each data element found to be associated with a data attribute object correspond to the scrubbing search criterion, compare the data object to the error correction object to determine if the data object contains errors In one embodiment, the electronic device further includes the computer readable medium.

In one embodiment, the error detection engine is further configured to output a report indicating which data elements include data objects which contain errors.

In one embodiment, the storage controller is further configured to receive an identified buffer location, and the error detection engine is further configured to output the report to the identified buffer location.

In one embodiment, the electronic device includes an attribute index for each attribute contained in the data attribute objects. The data analysis engine accesses data attribute objects associated with data elements by accessing the attribute indexes. The data analysis engine finds data elements associated with data attribute objects corresponding to the scrubbing search criterion by utilizing the attribute indexes to determine which data elements correspond to the scrubbing search criterion.

In one embodiment, the attribute index is a sorted tree.

In one embodiment, the storage controller is further configured to receive data and attribute values describing the received data, and the storage controller is configured to generate a new data element and a new data attribute object associated with the new data element, the new data attribute object containing the received attribute values and the data object of the new data element containing the received data.

In one embodiment, the storage controller is further configured to generate one or more attribute values, and the new data attribute object associated with the new data element contains the one or more generated attribute values in one embodiment, the storage controller is further configured to generate an error correction value corresponding to the received data, and the error correction object of the new data element contains the error correction value.

In one embodiment, the electronic device includes an attribute index for each attribute contained in the data attribute objects, and the storage controller is further configured to update each data attribute index to include a node corresponding to the new data element.

In another aspect of the present disclosure, a method of performing scrubbing on a data storage device is provided. One or more data elements are stored on the data storage device, each data element stored in association with one or more data attributes, each data element comprising a data object and an error correction object. The method includes the steps of receiving, by a processor, a scrubbing search criterion; locating, by the processor, the data elements associated with data attributes corresponding to the scrubbing search criterion; determining, by the processor, whether each of the located data elements with data attributes corresponding to the scrubbing search criterion need to be scrubbed; and outputting, by the processor, a report indicating which data elements contain errors in their data objects.

In another aspect of the present disclosure, a data scrubbing device is provided. The data scrubbing device includes a computer readable medium containing data elements, each data element stored in association with a data attribute object, each data element comprising a data object and an error correction object, each data attribute object containing a set number of attributes. The data scrubbing device also includes an attribute index for each attribute contained in the data attribute objects. The data scrubbing device further includes a storage controller. The storage controller includes a data analysis engine and an error detection engine. The data analysis engine is configured to find data elements contained in the computer readable medium associated with data attribute objects corresponding to the scrubbing search criterion utilizing the attribute indexes. The error detection engine is configured to, for each data element found to be associated with a data attribute object corresponding to the scrubbing search criterion, compare the data object to the error correction object to determine if the data object contains errors, and further configured to output a report indicating which data elements include data objects which contain errors to the identified buffer location.

BRIEF DESCRIPTION OF THE DRAWINGS

The accompanying drawings, together with the specification, illustrate example embodiments of the present disclosure, and, together with the description, serve to explain the principles of the present invention.

DETAILED DESCRIPTION

In the following detailed description, only certain example embodiments of the present invention are shown and described, by way of illustration. As those skilled in the art would recognize, the invention may be embodied in many different forms and should not be construed as being limited to the embodiments set forth herein. Descriptions of features or aspects within each example embodiment should typically be considered as available for other similar features or aspects in other example embodiments. Like reference numerals designate like elements throughout the specification.

The present disclosure is directed to a smart storage device. The smart storage device stores data in association with attribute values which describe the data and an error correction value which can be used to determine whether the data has been corrupted. The smart storage device may receive a scrubbing search criterion from an external device or application. The scrubbing search criterion describes the attributes belonging to the data to be scrubbed, but may not contain the locations of the data to be scrubbed. The smart storage device performs data scrubbing on the data meeting the scrubbing search criterion and may output a report indicating which data stored in the smart storage device meets the scrubbing search criterion and is corrupt.

Figure 1:
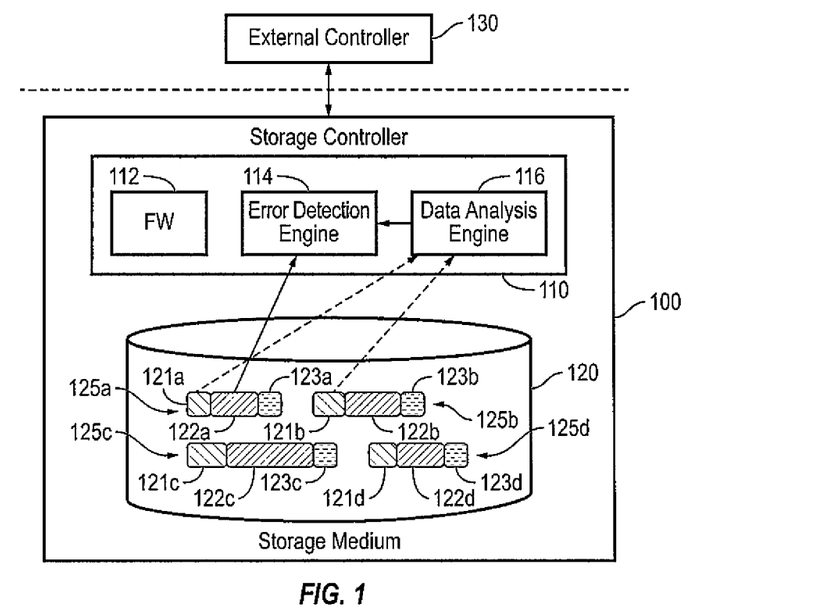
FIG. 1 is a block diagram of a storage device according to embodiments of the present disclosure.

FIG. 1 is a block diagram of a storage device according to embodiments of the present disclosure. A storage device 100 includes a storage controller 110 (e.g., a disk controller) and a storage medium 120. The storage controller 110 can communicate with an external controller 130. In some embodiments, external controller 130 executes a filesystem which manages the data contained on the storage medium 120. In other embodiments, external controller 130 manages the data contained on the storage medium 120 as a database.

Data is stored on the storage medium 120 in the form of data elements 125a-d (collectively referred to as "data element 125"). Each data element 125 includes a data attribute object 121a-d (collectively referred to as "data attribute object 121"), a data object 122a-d (collectively referred to as "data object 122"), and an error correction object 123a-d (collectively referred to as "error correction object 123") (e.g., a checksum value).

The data object 122 contains the substantive data which a device such as external controller 130 has stored on the storage medium 120.

The error correction object 123 contains redundant data to the data contained in the corresponding data object (for example, the error correction object 123a contains redundant data to the data contained in the data object 122a, and the error correction object 123b contains redundant data to the data contained in the data object 122b, etc.). In some embodiments, for example, the error correction object 123 contains a checksum value. In embodiments, the error correction object 123 may contain a value derived from cyclic redundancy check, erasure code, hash code, BCH code, Hamming code, and/or other error detection or correction methodologies. Note that, although described as "redundant data," in various embodiments, the data stored in the error correction object 123 may not literally contain the data or a portion of the data contained in the corresponding data object 122. In various embodiments, the redundant data may be smaller or larger than the data contained in the corresponding data object 122; accordingly, the "redundant data" can be larger than the data contained in the data object 122. The data contained in the error correction object 123 can be compared to the data contained in the corresponding data object 122 to determine whether the data object has been corrupted. Those having ordinary skill in the art at the time of filing this application will be familiar with a number of possible configurations for the error correction object 123.

Note that in some embodiments, while data object 122 and error correction object 123 are referred to as separate objects, the data stored in the data object 122 and the redundant data stored in the error correction object 123 may take the form of a single piece of inseparable data. For example, in various error detection or error correction codes or methodologies, the redundant data may be interspersed within the data, or the redundant data may be used to transform the data, resulting in the data and the redundant data forming inseparable components of a data object.

The data attribute object 121 includes values for attributes describing the corresponding data object 122 (for example, the data attribute object 121a contains values describing the data object 122a, and the data attribute object 122b contains values describing the data object 122b, etc.). In some embodiments, the data attribute objects 121 can include values indicating the creation date, last modification date, and/or size of the data contained in the data object 122. In some embodiments, the data attribute objects 121 can indicate the user or the program that created the data contained in the data object 122, or the user or program that attempted to store the data contained in the data object 122 in the storage medium 120.

In one embodiment, the data attribute object 121 includes a value for a sensitivity attribute of the data contained in the data object 122. Sensitivity may be divided into arbitrary levels. Critical data or data for which small corruption errors are a larger problem may be assigned a higher sensitivity level. In some embodiments, data with a higher sensitivity level may be scrubbed more frequently.

In some embodiments, the data attribute objects 121 can include values indicating the last time and date of scrubbing the data contained in the data object 122.

Figure 2:
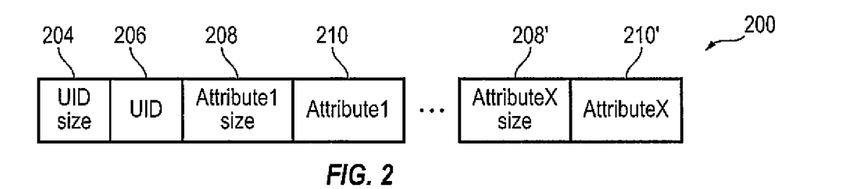
FIG. 2 is a diagram of a data attribute object according to embodiments of the present disclosure.

FIG. 2 is a diagram of one embodiment of a data attribute object 200. The data attribute object 200 includes a block 204 which contains a value indicating the size of the following block 206. The block 206 contains a value which is a unique identifier (hereinafter 'UID') for the data element 125 which contains the data attribute object 200. Each data element 125 in a storage medium may have a unique UID.

The block 208 contains a value indicating the size of the following block 210. The block 210 contains a value which describes an attribute of the data object 122 (or, for example, an attribute of the data contained therein) corresponding to the data attribute object 200, which may be described as Attribute 1.

Embodiments of data attribute objects such as the data attribute object 200 can include various numbers of attributes. Each attribute may include a block containing a value indicating a size of the following block, and a block containing a value of the attribute. For example, the data attribute object 200 includes X attributes; accordingly, the data attribute object 200 includes blocks up to and including a block 208' which contains a value indicating the size of the value which describes Attribute X and a block 210' which contains a value which describes Attribute X.

In the example data attribute object 200, the values for attributes describing the corresponding data object can have a variable size. In alternative embodiments, each value may have a specified length. Accordingly, in such embodiments, the data attribute object may not contain blocks describing the size of the value.

Returning to FIG. 1, the storage controller 110 includes firmware 112, an error detection engine 114, and a data analysis engine 116.

The storage controller 110 may receive a scrubbing search criterion from the external controller 130. The scrubbing search criterion may contain at least one specified attribute, a value of the specified attribute, and a relational identifier (for example, less than, greater than, equal to, greater than or equal to, or less than or equal to). In some embodiments, the scrubbing search criterion contains a plurality of specified attributes, corresponding attribute values, and corresponding relational identifiers, and "AND," "OR," "XOR" or other relationships between each. Together, any scrubbing search criterion received and corresponding relational identifiers form a data match rule. The attribute values contained in a data attribute object 121 can be compared to a data match rule to determine whether the data attribute object 121 meets the data match rule.

For example, a scrubbing search criterion may include Attribute 1 (corresponding to file size) is less than 50 mb, AND Attribute 2 (corresponding to creation date) is later than Jan. 1, 2016, AND Attribute 2 is before Jan. 31, 2016. Accordingly, a data attribute object 121 corresponding to a data object 122 containing less than 50 mb of data created during January 2016 would pass the data match rule. A data attribute object 121 corresponding to a data object 122 containing more than 50 mb of data or containing data not created in January 2016 would not pass the data match rule.

The data analysis engine 116 can access the values contained in the data attribute objects 121. When the storage controller 110 receives a scrubbing search criterion, the data analysis engine 116 determines which data elements 125 contain data attribute objects 121 that meet the data match rule. The data analysis engine 116 indicates to the error detection engine 114 which data elements 125 were found to have data attribute objects 121 that meet the data match rule. This can be accomplished by passing the UID of each data element 125 to the error detection engine 114, or by passing the data contained in the data element 125, at least including the data contained in the data object 122 and the error correction object 123, directly to the error detection engine 114.

The error detection engine 114 determines which, if any, of the data elements 125 that meet the data match rule contain errors or are corrupt based on a comparison between the data contained in the error correction object 123 and the data contained in the data object 122. For example, the comparison between the data contained in the error correction object 123 and the data contained in the data object 122 may take the form of an error detection method or mechanism called for by the coding scheme used to create the data contained in the error correction object 123. Those having ordinary skill in the art will be familiar with methods or mechanisms for performing such a comparison. These methods or mechanisms may include, without limitation, checksums, cyclic redundancy checks, erasure codes, hash codes, BCH codes, or Hamming codes. In some embodiments, the error detection engine 114 is a checksum engine.

In some embodiments, the error detection engine 114 generates a report that identifies the data elements 125 which both: (1) contain data attribute objects 121 which meet the data match rule; and (2) contain data objects 122 and error correction objects 123 which indicate, when compared, that the data contained in the data object 122 is corrupt. In some embodiments, the external controller 130 may identify a buffer along with the scrubbing search criterion, and the storage controller 110 may write the report to the identified buffer. The external controller 130 may read the report from the identified buffer. The external controller 130 may take steps to repair the identified corrupted data.

In some embodiments, the error correction object 123 contains sufficient redundant data to repair data contained in data objects 122 when they are determined to be corrupt. For example, the error correction object 123 may contain a value derived from a Hamming code. In such embodiments, upon determining that data stored in a data object 122 is corrupt, the error detection engine 114 may repair the corrupted data if it is able to repair the corrupted data. In some such embodiments, the report may indicate whether (1) an error was found and corrected; or (2) an error was found and could not be corrected.

Figure 3:
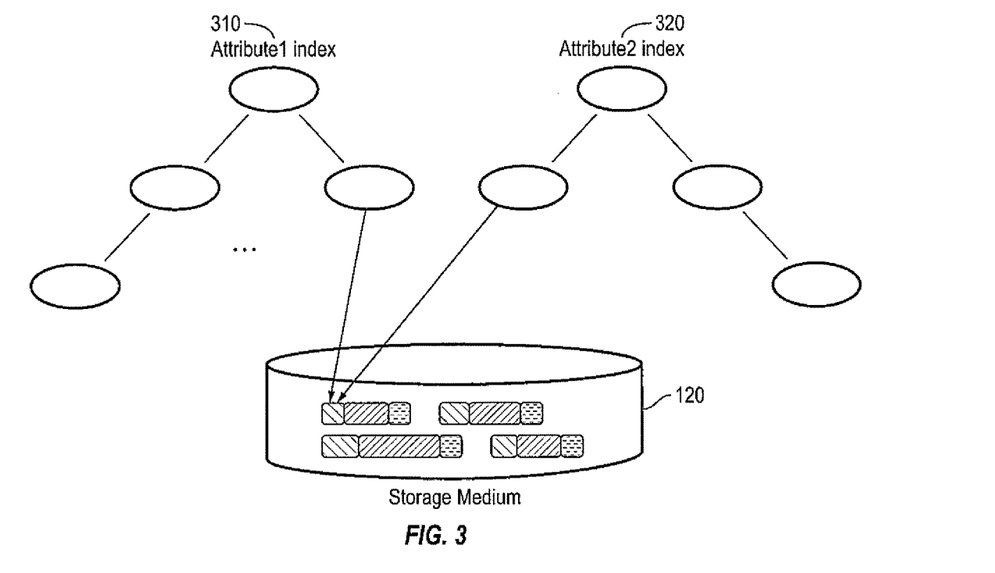
FIG. 3 is a diagram of first and second attribute indexes according to embodiments of the present disclosure.

FIG. 3 is a diagram of a first attribute index 310 and a second attribute index 320 according to some embodiments of the present disclosure. In some embodiments, the storage device 100 contains one attribute index for each attribute included in the data attribute objects 121 of the data elements 125 stored in the storage medium 120. For example, in FIG. 3, the data attribute objects 121 contain values for Attribute 1 and for Attribute 2. Accordingly, the storage device 100 includes the first attribute index 310 corresponding to Attribute 1 and the second attribute index 320 corresponding to Attribute 2. In such embodiments, the data analysis engine 116 may use the data attribute indexes to determine which data elements 125 contain data attribute objects 121 that meet the data match rule.

An attribute index includes a node for each data element 125 stored in the storage medium 120. The node for a given data element 125 contains the value for the corresponding attribute of the attribute index contained in the data attribute element 121 of the given data element 125 (for example, nodes in the first attribute index 310 corresponding to Attribute 1 contain the Attribute 1 value stored in each data attribute object 121). Each node also includes an identifier of the given data element 125 such as the UID or a pointer to the data element's position on the storage medium 120.

An attribute index may be sorted based on the values of the attributes contained in the nodes. In some embodiments, an attribute index is a sorted tree. When the data analysis engine 116 receives a scrubbing search criterion with a specified attribute, the data analysis engine 116 may use the attribute index corresponding to the specified attribute to return identifiers (such as UIDs) of all data elements 125 which have a value for the attribute corresponding to the specified attribute which satisfies the value of the specified attribute and the relational identifier.

In some embodiments, the nodes of an attribute index are data attribute objects 121. In some of such embodiments, data elements 125 are associated with data attribute objects 121 stored in attribute indexes, but data elements 125 do not contain data attribute objects 121, and the attributes describing the data contained in the data object 122 are not stored in the data element 125.

Figure 4:
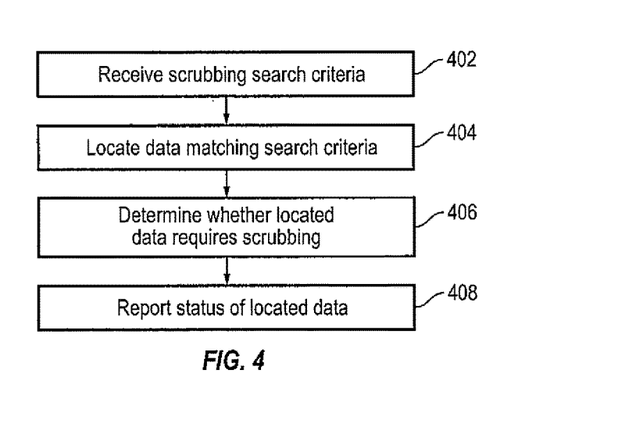
FIG. 4 is a flow chart depicting a process for locating data to scrub according to embodiments of the present disclosure.

FIG. 4 is a flow chart depicting a process for locating data to scrub according to embodiments of the present disclosure. This process may be performed, for example, by the device of FIG. 1.

At 402, scrubbing search criterion is received. The scrubbing search criterion contains a data match rule. For example, the scrubbing search criterion may contain at least one specified attribute, a specified value of the specified attribute, and a relational identifier (such as less than, greater than, equal to, greater than or equal to, or less than or equal to). In some embodiments, the scrubbing search criterion contains a plurality of specified attributes, corresponding attribute values, and corresponding relational identifiers, and "AND," "OR," "XOR" or other relationships defined between each which must be satisfied in order for the data match rule to be met. In some embodiments the location of an identified buffer is also received at 402. 402 may be performed, for example, by the storage controller 110 (or a processor associated with storage controller 110).

At 404, data elements 125 which meet the data match rule are located. 404 may be performed, for example, by the data analysis engine 116 (or a processor associated with the data analysis engine 116).

In some embodiments, the data elements 125 are located using attribute indexes, such as those described in reference to FIG. 3. For each specified access term in the data match rule, an attribute index corresponding to the same attribute is searched for nodes which satisfy the specified value of the specified attribute and the relational identifier.

In one embodiment, for example, the attribute index is a sorted tree. To search the attribute index for nodes satisfying the specified attribute and the relational identifier, a new node corresponding to the specified value for the specified attribute is added to the sorted tree and made to be the root node. All of the identifiers such as UIDs contained in nodes to the left or right of the root node, depending on the relational identifier (e.g. less than or greater than), are returned as indicating data elements 125 which satisfy the specified value of the specified attribute and the relational identifier. Where multiple specified values of specified attribute are included in a single data math rule, once the data elements 125 which satisfy each are found, the lists of data elements 125 are compared based on "AND," "OR," "XOR" or other relationships between each to establish a list of data elements 125 which satisfy the entire data match rule.

In alternative embodiments, however, the data attribute object 121 of each data element 125 contained in storage medium 120 is checked to determine if it passes the data match rule.

At 406, it is determined whether the data elements 125 which satisfy the data match rule which were located in 404 contain errors. 406 may be performed, for example, by the error detection engine 114 (or a processor associated with the error detection engine 114). The data contained in the data object 122 is compared to the redundant data contained in the error correction object 123. Based on this comparison, it is determined whether the data contained in data object 122 has been corrupted or otherwise has errors. A list of identifiers (such as UIDs or pointers to the location of the data element 125 on the storage medium 120) of each data element 125 which contains errors is returned.

At 408, the status of the located data elements 125 is reported. 408 may be performed, for example, by the storage controller 110 (or a processor associated with the storage controller 110). In some embodiments, a list of data elements 125 is generated. The list may include an identifier (such as UIDs or pointers to the location of the data element 125 in the storage medium 120) of each data element 125. In some embodiments, the list includes each data element 125 which was found to have errors. The errors may be uncorrected. In alternative embodiments, the list includes each data element 125 which passed the data match rule and the status of each data element 125 (e.g., does or does not contain errors).

In some embodiments where a buffer was identified, such as during 402, the report is stored at the identified buffer location. In some embodiments, where the error correction object 123 contains sufficient redundant data, any detected errors in the data stored in data objects 123 may be repaired.

Figure 5:
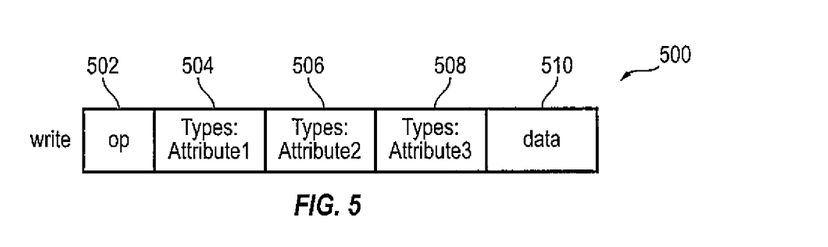
FIG. 5 is a diagram of a write command received from an external controller according to embodiments of the present disclosure.

FIG. 5 is a diagram of a write command 500 received by a storage controller 110 from an external controller 130 according to embodiments of the present disclosure. The command includes an operation block 502 which contains a value indicating to the storage controller 110 what action is to be performed. Here, the value in the operation block 502 indicates that the storage controller should write data to the storage medium in response to the command 500.

The block 504 contains a value for Attribute 1. The block 506 contains a value for Attribute 2. The block 508 contains a value for Attribute 3. In some embodiments, the number of blocks containing values for attributes is set, and each write command should contain a value for each attribute. The block 510 contains the data to be stored on the storage medium 120. The values of the attributes, such as Attribute 1, Attribute 2, and Attribute 3, describe the data contained in block 510.

Figure 6:
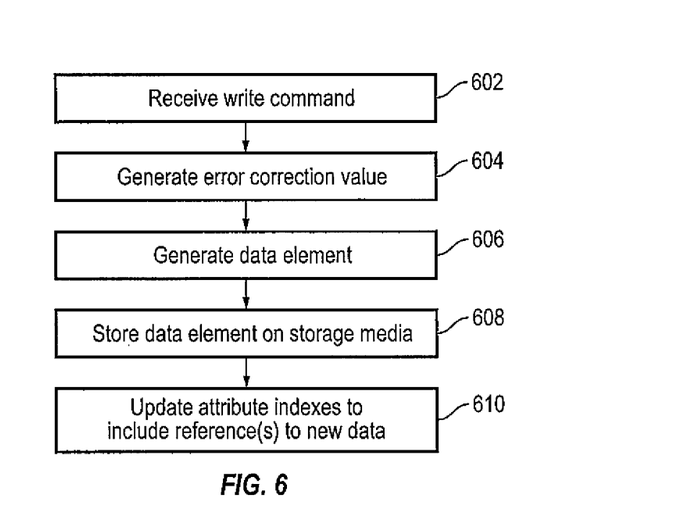
FIG. 6 is a flow chart depicting writing data to a storage device according to embodiments of the present disclosure.

FIG. 6 is a flowchart depicting writing data to a storage device 100 according to embodiments of the present disclosure. The process may be performed, for example, by the device of FIG. 1.

At 602, a write command is received. The write command may be, for example, the write command 500 of FIG. 5. 602 may be performed by the storage controller 110 (or a processor associated with the storage controller 110). The write command may contain data to be written to the storage medium 120 and attribute values describing attributes of the data.

At 604, an error correction value is generated. 604 may be performed by the storage controller 110 (or a processor associated with the storage controller 110). Upon creation, the error correction value corresponds to the value of the data to be stored in the storage medium 120. If, at a later time, the data becomes corrupted or otherwise contains errors, comparing the error correction value with the data may show that the data has been corrupted or otherwise changed from its original form improperly. In some embodiments, the error correction value is a checksum value. In alternative embodiments, the error correction value may be a copy of the data or a portion of the data. In further alternative embodiments, the error correction value may be derived by applying cyclic redundancy checks, erasure codes, hash codes, BCH codes, Hamming codes, and/or other error detection or correction methodologies.

In alternative embodiments, the error correction value is received at 602 as part of the write command.

At 606, a data element 125 is generated. 606 may be performed, for example, by the storage controller 110 (or a processor associated with the storage controller 110).

The data element 125 may include a data attribute object 121. The data attribute block may contain attribute values describing the data which will be stored with the data element 125. In some embodiments, the attribute values contained in the data attribute object 121 may be attribute values contained in the write command received at 602. In some embodiments, the data attribute object 121 may additionally include attribute values not received in the write command. For example, the data attribute object 121 may contain attribute values for date and time added to the storage medium 120, the last date and time the data was checked for errors, the last time the data was scrubbed, or other data attributes which can be discerned without receiving them from the write command.

Following the data attribute object 121, the data element 125 may include a data object 122. The data object may include the data to be stored on the storage medium 120 which was received as part of the write command at 602. Following the data object 122, the data element 125 may include an error correction object 123. The error correction object 123 may contain the error correction value generated at 604.

At 608, the generated data element 125 may be stored in the storage medium 120. 608 may be performed by the storage controller 110 (or a processor associated with the storage controller 110).

At 610, in some embodiments in which the storage device 100 includes data attribute indexes for use in locating data objects 125, each attribute index is updated with a new node corresponding to the generated data element 125. Each new node may contain the value contained in the data attribute object 121 which corresponds with the attribute index and an identifier of the given data element 125 such as the UID or a pointer to the data element's position on the storage medium 120. In embodiments in which the attribute indexes are sorted, such as embodiments where the attribute indexes are sorted trees, the attribute index is updated such that it remains sorted.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. For example, the storage controller 110 may include one processor in which the firmware 112, the error detection engine 114, and the data analysis engine 116 are implemented. Alternatively, the storage controller 110 may include a first processor in which the firmware 112 is implemented, a second processor in which the error detection engine 114 is implemented, and a third processor in which the data analysis engine 116 is implemented. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present invention.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. An electronic device comprising:
   a storage controller configured to receive a scrubbing search criterion, the storage controller comprising;
      a data analysis engine configured to access a data attribute object associated with a data element contained in a computer readable medium, each data element being stored in association with a data attribute object, each data element comprising a data object and an error correction object, the data analysis engine being further configured to find data elements contained in the computer readable medium associated with data attribute objects corresponding to the scrubbing search criterion; and
      an error detection engine configured to, for each data element found to be associated with a data attribute object correspond to the scrubbing search criterion, compare the data object to the error correction object to determine if the data object contains errors.

2. The device of claim 1 further comprising the computer readable medium.

3. The device of claim 1, wherein the error detection engine is further configured to output a report indicating which data elements include data objects which contain errors.

4. The device of claim 3, wherein the storage controller is further configured to receive an identified buffer location, and wherein the error detection engine is further configured to output the report to the identified buffer location.

5. The device of claim 1, further comprising an attribute index for each attribute contained in the data attribute objects,
   wherein the data analysis engine accesses data attribute objects associated with data elements by accessing the attribute indexes, and
   wherein the data analysis engine finds data elements associated with data attribute objects corresponding to the scrubbing search criterion by utilizing the attribute indexes to determine which data elements correspond to the scrubbing search criterion.

6. The device of claim 5, wherein the attribute index is a sorted tree.

7. The device of claim 1, wherein:
   the storage controller is further configured to receive data and attribute values describing the received data, and
   the storage controller is configured to generate a new data element, and a new data attribute object associated with the new data element, the new data attribute object containing the received attribute values and the data object of the new data element containing the received data.

8. The device of claim 7, wherein the storage controller is further configured to generate one or more attribute values, and wherein the new data attribute object associated with the new data element contains the one or more generated attribute values.

9. The device of claim 7, wherein the storage controller is further configured to generate an error correction value corresponding to the received data, and wherein the error correction object of the new data element contains the error correction value.

10. The device of claim 7, further comprising an attribute index for each attribute contained in the data attribute objects, and wherein the storage controller is further configured to update each data attribute index to include a node corresponding to the new data element.

11. A method of performing scrubbing on a data storage device, one or more data elements being stored on the data storage device, each data element stored in association with one or more data attributes, each data element comprising a data object and an error correction object, the method comprising:
   receiving, by a processor, a scrubbing search criterion;
   locating, by the processor, the data elements associated with data attributes corresponding to the scrubbing search criterion;
   determining, by the processor, whether each of the located data elements with data attributes corresponding to the scrubbing search criterion need to be scrubbed; and
   outputting, by the processor, a report indicating which data elements contain errors in their data objects.

12. The method of claim 11, wherein the data elements are contained on a computer readable medium.

13. The method of claim 11, further comprising receiving an identified buffer location, wherein outputting the report is outputting the report to the identified buffer location.

14. The method of claim 11, wherein locating the data elements with data attributes corresponding to the scrubbing search criterion comprises searching an attribute index for nodes corresponding to the scrubbing search criterion.

15. The method of claim 14, wherein the attribute index is a sorted tree.

16. The method of claim 11, further comprising:
   receiving, by the processor, received data and attribute values describing the received data; and
   generating, by the processor, a new data element, the new data element being stored in association with the received attribute values and the data object of the new data element containing the received data.

17. The method of claim 16, further comprising generating, by the processor, one or more generated attribute values, wherein the new data element is stored in association with the one or more generated attribute values.

18. The method of claim 16, further comprising generating, by the processor, an error correction value corresponding to the received data, and wherein the error correction object of the new data element contains the error correction value.

19. The method of claim 16, further comprising updating, by the processor, an attribute index to contain a node corresponding to the new data element.

20. A data scrubbing device comprising:
   a non-transitory computer readable medium containing data elements, each data element stored in association with a data attribute object, each data element comprising a data object and an error correction object, each data attribute object containing a set number of attributes;
   an attribute index for each attribute contained in the data attribute objects;

a storage controller configured to receive a scrubbing search criterion and an identified buffer location, the storage controller comprising;
  a data analysis engine configured to find data elements contained in the computer readable medium associated with data attribute objects corresponding to the scrubbing search criterion utilizing the attribute indexes; and
  an error detection engine configured to, for each data element found to be associated with a data attribute object corresponding to the scrubbing search criterion, compare the data object to the error correction object to determine if the data object contains errors, and further configured to output a report indicating which data elements include data objects which contain errors to the identified buffer location.

* * * * *